US009769256B2

(12) United States Patent
Murrett et al.

(10) Patent No.: US 9,769,256 B2
(45) Date of Patent: *Sep. 19, 2017

(54) DIRECTING DATA IN A WEB BROWSER FROM A PORTABLE ELECTRONIC DEVICE

(71) Applicant: Apple Inc., Cupertino, CA (US)

(72) Inventors: Martin J. Murrett, San Francisco, CA (US); Kevin R. G. Smyth, Portland, OR (US); Ian J. Elseth, Washougal, WA (US); Richard C. Cave, Camas, WA (US)

(73) Assignee: Apple Inc., Cupertino, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/664,751

(22) Filed: Mar. 20, 2015

(65) Prior Publication Data
US 2015/0201011 A1 Jul. 16, 2015

Related U.S. Application Data

(63) Continuation of application No. 12/619,498, filed on Nov. 16, 2009, now Pat. No. 8,990,404.

(51) Int. Cl.
G06F 15/16 (2006.01)
H04L 29/08 (2006.01)
H04L 29/06 (2006.01)

(52) U.S. Cl.
CPC ........ H04L 67/104 (2013.01); H04L 65/1059 (2013.01); H04L 65/1069 (2013.01); H04L 67/02 (2013.01)

(58) Field of Classification Search
CPC .... H04L 67/104; H04L 67/02; H04L 65/1069
See application file for complete search history.

(56) References Cited

U.S. PATENT DOCUMENTS

| | | | |
|---|---|---|---|
| 2005/0010656 A1* | 1/2005 | Lee ........................ | H04L 29/06 709/223 |
| 2006/0174021 A1* | 8/2006 | Osborne ............... | H04L 65/608 709/230 |
| 2007/0118426 A1* | 5/2007 | Barnes, Jr. ......... | G06Q 10/1053 379/114.13 |
| 2007/0136778 A1* | 6/2007 | Birger ................. | G11B 19/025 725/117 |
| 2007/0161402 A1* | 7/2007 | Ng ......................... | H04L 67/06 455/554.2 |

(Continued)

OTHER PUBLICATIONS

WebSplitter: A Unified XML Framework for Multi-Device Collaborative Web Browsing Article • Apr. 2001 DOI: 10.1145/358916.358993 • Source: CiteSeer.*

(Continued)

Primary Examiner — Razu A Miah
(74) Attorney, Agent, or Firm — Downey Brand LLP

(57) ABSTRACT

Some embodiments provide a system for interacting with a web browser. During operation, the system establishes a network connection with the web browser from a portable electronic device. Next, the system provides data to the web browser using a web server on the portable electronic device. Finally, the system sends a set of control instructions from the web server to the web browser, wherein the control instructions direct the web browser to obtain and display the data.

17 Claims, 6 Drawing Sheets

(56) References Cited

U.S. PATENT DOCUMENTS

| | | | | |
|---|---|---|---|---|
| 2007/0174423 A1* | 7/2007 | Yoshida | H04L 67/02 | 709/217 |
| 2007/0178891 A1* | 8/2007 | Louch | H04M 11/007 | 455/420 |
| 2007/0183436 A1* | 8/2007 | Hunter | H04L 67/02 | 370/401 |
| 2007/0199076 A1* | 8/2007 | Rensin | H04L 29/06027 | 726/27 |
| 2007/0213039 A1* | 9/2007 | Skog | H04L 65/1006 | 455/414.3 |
| 2008/0172449 A1* | 7/2008 | Bengtsson | H04M 1/72561 | 709/203 |
| 2008/0195698 A1* | 8/2008 | Stefanovic | H04N 7/17327 | 709/203 |
| 2009/0195706 A1* | 8/2009 | Kikkawa | H04N 1/00129 | 348/739 |
| 2009/0228779 A1* | 9/2009 | Williamson | G06F 9/54 | 715/233 |
| 2010/0100536 A1* | 4/2010 | Chamberlain | G06F 17/30864 | 707/706 |
| 2010/0241254 A1* | 9/2010 | McKinley | G08C 17/02 | 700/90 |
| 2012/0290951 A1* | 11/2012 | Utsuki | H04L 67/02 | 715/753 |
| 2013/0031177 A1* | 1/2013 | Willis | H04L 67/02 | 709/204 |
| 2014/0195675 A1* | 7/2014 | Silver | H04L 65/1083 | 709/224 |

OTHER PUBLICATIONS

Systems and methods for displaying media content and media guidance information Publication No. WO 2009/151635 A1 Publication Date: Dec. 17, 2009.*

* cited by examiner

DIRECTING DATA IN A WEB BROWSER FROM A PORTABLE ELECTRONIC DEVICE

CROSS-REFERENCE TO RELATED APPLICATIONS

This application is a continuation of U.S. application Ser. No. 12/619,498, filed Nov. 16, 2009, entitled "DIRECTING DATA IN A WEB BROWSER FROM A PORTABLE ELECTRONIC DEVICE," now U.S. Pat. No. 8,990,404 issued Mar. 24, 2015, the contents of which are incorporated herein by reference in their entirety for all purposes.

FIELD

The present embodiments relate to interaction between a web browser and a portable electronic device. More specifically, the present embodiments relate to techniques for directing the display of data in the web browser from the portable electronic device.

BACKGROUND

Modern portable electronic devices typically include functionality to create, store, open, and/or update various forms of digital media. For example, a mobile phone may include a camera for capturing images, memory in which images may be stored, software for viewing images, and/or software for editing images. Moreover, the portability and convenience associated with portable electronic devices allows users of the portable electronic devices to incorporate digital media into everyday activities. For example, the camera on a mobile phone may allow a user of the mobile phone to take pictures at various times and in multiple settings, while the display screen on the mobile phone and installed software may allow the user to display the pictures to others.

However, size and resource limitations may prevent users of portable electronic devices from effectively sharing media on the portable electronic devices. For example, the display screen on a mobile phone may be too small to show pictures to a large group of people and/or at a sufficient resolution. Instead, the mobile phone user may show the pictures on a large display by copying the pictures from the mobile phone to a different electronic device that is connected to the larger display.

Hence, what is needed is a mechanism for facilitating the sharing of media from a portable electronic device.

SUMMARY

The described embodiments provide a system for interacting with a web browser. During operation, the system establishes a network connection with the web browser from a portable electronic device. Next, the system provides data to the web browser using a web server on the portable electronic device. Finally, the system sends a set of control instructions from the web server to the web browser, wherein the control instructions direct the web browser to obtain and display the data.

In some embodiments, providing the data to the web browser using the web server involves receiving requests associated with the control instructions from the web browser, and responding to the requests with the data.

In some embodiments, the control instructions are sent to the web browser using a control channel with the web server.

In some embodiments, the data includes at least one of a web application, a webpage, a document, and an image.

In some embodiments, establishing a network connection with the web browser from the portable electronic device involves broadcasting a service associated with the web server using a service discovery protocol, and enabling the network connection with the web browser using the service discovery protocol.

In some embodiments, the display of the data in the web browser is associated with at least one of a photo slideshow, a presentation, and a document.

In some embodiments, the portable electronic device corresponds to a mobile phone.

In some embodiments, the display of data on the web browser is controlled by a user of the portable electronic device.

BRIEF DESCRIPTION OF THE DRAWINGS

In the figures, like reference numerals refer to the same figure elements.

DETAILED DESCRIPTION

Figure 1:
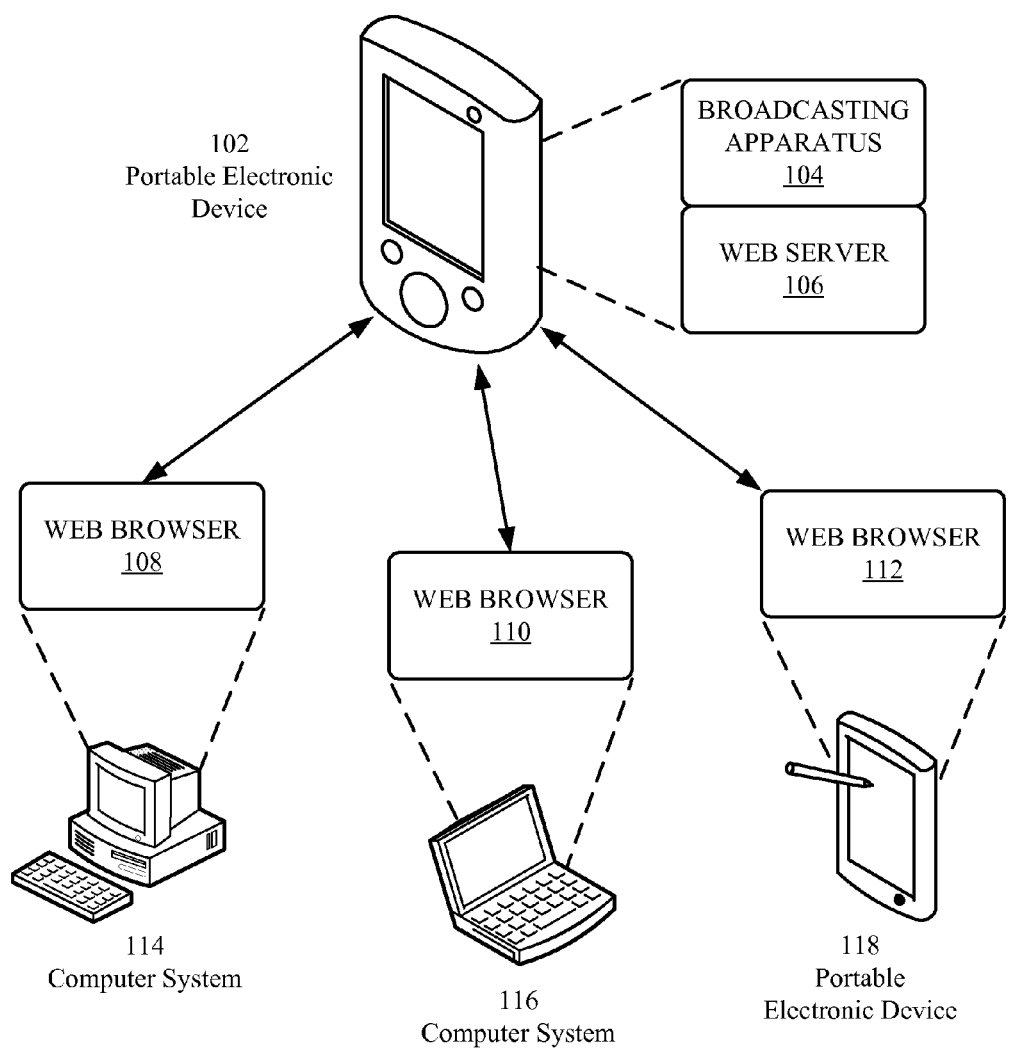
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for interacting with a portable electronic device such as a mobile phone, personal digital assistant (PDA), and/or portable media player. More specifically, embodiments provide a method and system for facilitating interaction between the portable electronic device and a web browser. The portable electronic device may include a web server that provides a service, which in turn is broadcast using a service discovery protocol. A network connection between the web server and web browser may then be established using the service discovery protocol. Using the network connection, the web server may send data to the web browser. In addition, the web server may direct the display of the data on the web browser by sending a set of control instructions to the web browser. As a result, the web server may allow a user of the portable electronic device to share digital media and/or other data from the portable electronic device with web browsers on other electronic devices. For example, the user may control the display of a photo slideshow, a presentation, and/or a document in the web browsers from the portable electronic device.

FIG. 1 shows a schematic of a system in accordance with an embodiment. As shown in FIG. 1, the system includes a portable electronic device 102, a set of computer systems 114-116, and a different portable electronic device 118. Computer systems 114-116 and portable electronic device 118 each include a web browser 108-112, and portable electronic device 102 includes a broadcasting apparatus 104 and a web server 106. Portable electronic device 102 and portable electronic device 118 may correspond to mobile phones, personal digital assistants (PDAs), portable media players, and/or other compact electronic devices that include functionality to store digital media such as documents, images, audio, and/or video. Computer systems 114-116 may correspond to personal computers, laptop computers, workstations, and/or other electronic devices that typically include more resources (e.g., processing power, display size, memory, etc.) than portable electronic device 102 or portable electronic device 118.

In one or more embodiments, the system of FIG. 1 facilitates interaction between portable electronic device 102 and web browsers 108-112. In particular, the system of FIG. 1 may allow portable electronic device 102 to transmit data to web browsers 108-112 via a network connection with web browsers 108-112 and direct the display of data within web browsers 108-112. Furthermore, the display of data within web browsers 108-112 may be controlled by a user of portable electronic device 102. For example, the user may control the display of a photo slideshow, presentation, and/or document on web browsers 108-112 from an application on portable electronic device 102. In other words, interaction between portable electronic device 102 and web browsers 108-112 may facilitate the sharing of digital media on portable electronic device 102 by allowing the digital media to be played and/or viewed in web browsers 108-112 executing on other electronic devices (e.g., computer systems 114-116, portable electronic device 118).

To enable network connections between portable electronic device 102 and web browsers 108-112, broadcasting apparatus 104 may broadcast a service associated with web server 106 using a service discovery protocol. Upon detecting the service, web browsers 108-112 may connect to web server 106 using the service discovery protocol. For example, broadcasting apparatus 104 may use a wireless transmitter on portable electronic device 102 and the Bonjour (Bonjour™ is a registered trademark of Apple Inc.) service discovery protocol to broadcast the service to electronic devices (e.g., computer systems 114-116, portable electronic device 118) on the same local area network (LAN) as portable electronic device 102. The service may be found on web browsers 108-112 as a Bonjour bookmark; users of web browsers 108-112 may select the Bonjour bookmark to connect to web server 106 and receive data from web server 106. On the other hand, if a web browser does not support Bonjour, a user of the web browser may connect to web server 106 by providing a Uniform Resource Locator (URL) associated with web server 106 to the web browser.

In one or more embodiments, data sent from web server 106 to web browsers 108-112 includes web applications, webpages, documents, images, and/or other types of digital media. For example, web server 106 may enable the display of a photo slideshow on web browsers 108-112 by sending a Javascript (Javascript™ is a registered trademark of Sun Microsystems, Inc.) application, one or more software libraries, and/or one or more HyperText Markup Language (HTML) documents to web browsers 108-112. Once the photo slideshow is enabled on web browsers 108-112, web server 106 may transmit images to be displayed within the photo slideshow and/or control instructions associated with displaying the images to web browsers 108-112.

In one or more embodiments, control instructions are used by web server 106 to provide data for display to web browsers 108-112. In particular, web server 106 may send a set of control instructions to web browsers 108-112 that direct web browsers 108-112 to obtain specific types of data from web server 106. The control instructions may be sent from web server 106 to web browsers 108-112 using a control channel between web server 106 and web browsers 108-112. Web browsers 108-112 may then send requests (e.g., HyperText Transfer Protocol (HTTP) requests) for the data to web server 106, which may respond with the requested data. As discussed in further detail below with respect to FIGS. 2 and 5, control instructions may also be used by web server 106 to control non-data-based output in web browsers 108-112.

As mentioned above, the display of data on web browsers 108-112 may be controlled by a user of portable electronic device 102. More specifically, the user may generate commands that control the broadcasting of services on portable electronic device 102 from broadcasting apparatus 104, as well as the transmission of control instructions between web server 106 and web browsers 108-112. In one or more embodiments, the user accesses an application on portable electronic device 102 to start web server 106 and/or broadcasting apparatus 104. The user may also use the application to specify preferences associated with the operation of web server 106 and/or broadcasting apparatus 104. For example, the user may grant or deny requests to connect with web server 106 from one or more web browsers (e.g., web browsers 108-112) and/or specify the functionality of web server 106 (e.g., displaying a photo slideshow, displaying a presentation, displaying a document, playing audio, etc.).

After connected web browsers are configured to display data from web server 106 (e.g., within a web application), the user may use the application to select digital media and/or other data for display within web browsers 108-112. For example, the user may generate commands that specify the display of a specific image, portion of a document, and/or slide of a presentation on web browsers 108-112. In other words, the user may guide the real-time display of data in web browsers 108-112 from portable electronic device 102. The data may also be processed by the application, web server 106, and/or another component on portable electronic device 102 before the data is sent to web browsers 108-112. For example, images selected for display within a slideshow may be scaled by an image-processing module on portable electronic device 102 prior to transmitting the images to web browsers 108-112 for display.

Those skilled in the art will appreciate that web browsers 108-112 may connect to and/or disconnect from web server 106 at different times. As a result, web server 106 may include functionality to handle and track events related to interaction with individual web browsers 108-112 by maintaining session information for each web browser 108-112 that connects to web server 106. If a web browser connects to web server 106 after web server 106 has started transmitting data to be displayed in connected web browsers, the new web browser may receive the data in mid-stream, along with software libraries, web applications, and/or webpages used to view the data. For example, a web browser that connects to web server 106 in the middle of a presentation may receive the next slide of the presentation and omit the display of slides that were transmitted prior to connecting with web server 106. Alternatively, the web browser may also receive previously transmitted data if web server 106 is configured to handle different data streams to different web browsers and/or if such functionality is enabled by the user of portable electronic device 102.

Furthermore, web server 106 may transmit data to different web browsers 108-112 based on characteristics of the network connection between web server 106 and each web browser and/or the electronic device on which the web browser resides. For example, electronic devices with large display screens and/or faster connection speeds may receive data at a higher bit rate and/or resolution from web server 106 than electronic devices with smaller display screens and/or slower connection speeds. Along the same lines, effects such as the animation of a laser pointer within a slideshow or presentation may be displayed at a higher frame rate in electronic devices with faster connection speeds than in electronic devices with slower connection speeds.

Although the example described above illustrates how a single electronic device can be used to communicate and operate with multiple browsers, the same techniques can be generalized to allow multiple electronic devices to communicate with one or more browsers. This generalization can facilitate collaboration between the users of the multiple electronic devices, and can enable a wider audience to participate in a presentation. For example, users of the multiple electronic devices can each control their own pointer within a presentation. In this way, multiple pointers controlled by different people can appear on the display at the same time.

Figure 2:
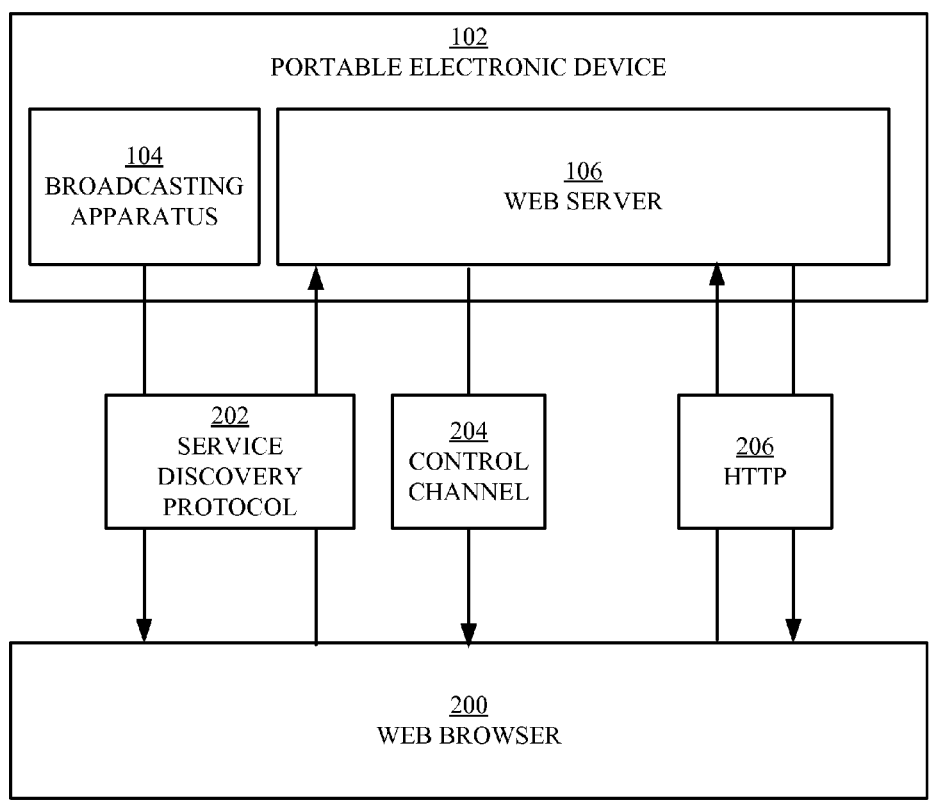
FIG. 2 shows a set of mechanisms for facilitating interaction between a portable electronic device and a web browser in accordance with an embodiment.

FIG. 2 shows a set of mechanisms for facilitating interaction between portable electronic device 102 and a web browser 200 in accordance with an embodiment. More specifically, FIG. 2 shows a set of mechanisms for establishing a network connection between portable electronic device 102 and web browser 200 and transmitting data between portable electronic device 102 and web browser 200. As described above, portable electronic device 102 may correspond to a network-enabled mobile phone and/or other compact electronic device that is configured to store digital media. Web browser 200 (e.g., web browsers 108-112 of FIG. 1) may be provided by a computer system and/or different portable electronic device on the same LAN as portable electronic device 102.

As shown in FIG. 2, broadcasting apparatus 104 may utilize a service discovery protocol 202 to broadcast a service associated with web server 106 on portable electronic device 102. For example, broadcasting apparatus 104 may correspond to a software and/or hardware module on portable electronic device 102 that uses the Bonjour service discovery protocol to broadcast a Bonjour-advertised service associated with web server 106 on the LAN to which portable electronic device 102 is connected. Web browser 200 may use service discovery protocol 202 to detect the service and connect to web server 106. For example, web browser 200 may display a Bonjour bookmark to a user of web browser 200 upon detecting a Bonjour-advertised service associated with web server 106. If the user selects the Bonjour bookmark, web browser 200 may connect to web server 106 using Bonjour. Alternatively, if web browser 200 does not support service discovery protocol 202, web browser 200 may obtain a hyperlink and/or URL to web server 106 and connect to web server 106 using the hyperlink and/or URL.

Once the network connection is established between web server 106 and web browser 200, web server 106 may send one or more webpages, web applications, software libraries, and/or other files to web browser 200 to allow web browser 200 to receive and share digital media from portable electronic device 102. The files may be associated with the URL used by web browser 200 to connect to web server 106. After the files are loaded by web browser 200, web server 106 may use a control channel 204 to direct the display of data within web browser 200.

In one or more embodiments, control channel 204 is created by configuring web browser 200 to repeatedly request a specific resource (e.g., using a URL) from web server 106. Web server 106 may then send control instructions to web browser 200 through control channel 204 as responses to the repeated request. Moreover, such responses may be delayed by web server 106 until the user of portable electronic device 102 generates a command that prompts an action by web browser 200. For example, web server 106 may respond to a request by web browser 200 with a control instruction only after the user has selected a photo for display on web browser 200.

In one or more embodiments, the control instructions may be used to facilitate the transmission of data from web server 106 to web browser 200. Once web browser 200 receives a control instruction associated with obtaining data from web server 106, web browser 200 may send a HyperText Transfer Protocol (HTTP) 206 request for the data to web server 106. Web server 106 may then process the request and respond with the requested data using HTTP 206. For example, interaction between web server 106 and web browser 200 for displaying an image in a photo slideshow within web browser 200 may include the following requests from web browser 200 and responses from web server 106:

request: GET dynamic/next
response: show 131 request: GET image/131
response: data for image/131

The first request (e.g., "GET dynamic/next") may be used to establish and maintain control channel 204. If a Transmission Control Protocol (TCP) between web browser 200 and web server 106 times out before a response is received, web browser 200 may repeat the request. Web server 106 may respond to the request using a control instruction (e.g., "show 131") that directs web browser 200 to show an image. For example, web server 106 may send the control instruction to web browser 200 after the user selects the image for display within an application on portable electronic device 102. To show the image, web browser 200 may send an HTTP 206 request for the image (e.g., "GET image/131") to web server 106, which in turn may process the request and send an HTTP 206 response containing data for the image.

Control instructions may also be used by web server 106 for purposes other than transmitting data to web browser 200. In other words, such control instructions may not require the use of HTTP 206 requests and responses to accomplish the intended effect. For example, non-data-based control instructions may be used to draw shapes within web browser 200, rotate and translate images in a photo slideshow, and/or display a laser pointer on a specific portion of an image. In addition, web browser 200 may simply display effects associated with non-data-based control instructions without requesting data (e.g., images, files, etc.) from web server 106. For example, web browser 200 may display the output of a drawing utility that is controlled from portable electronic device 102. To process the non-data-based control instructions, web browser 200 may execute one or more portions of a web application. For example, web browser 200 may execute a control instruction associated with showing a laser pointer in a photo slideshow by making function calls to a laser-pointer module in a web application used to display the photo slideshow.

As mentioned previously, commands for directing the display of data on web browser 200 may be generated by a user of portable electronic device 102. As a result, control instructions may be sent from web server 106 to web browser 200 in response to the user's interaction with portable electronic device 102. For example, the user may use an application on portable electronic device 102 to direct the display of a presentation, document, and/or photo slideshow in web browser 200. The user may select the documents and/or images to be displayed, control the display of the documents and/or images from web browser 200, and/or generate effects (e.g., laser pointers, transformations, etc.) associated with the display of the documents and/or images. Each of the user's actions may generate a corresponding control instruction from web server 106 to web browser 200 to produce the desired effect. Consequently, the user may use portable electronic device 102 as a mechanism for controlling the output of web browser 200 on a different electronic device.

Figure 3:
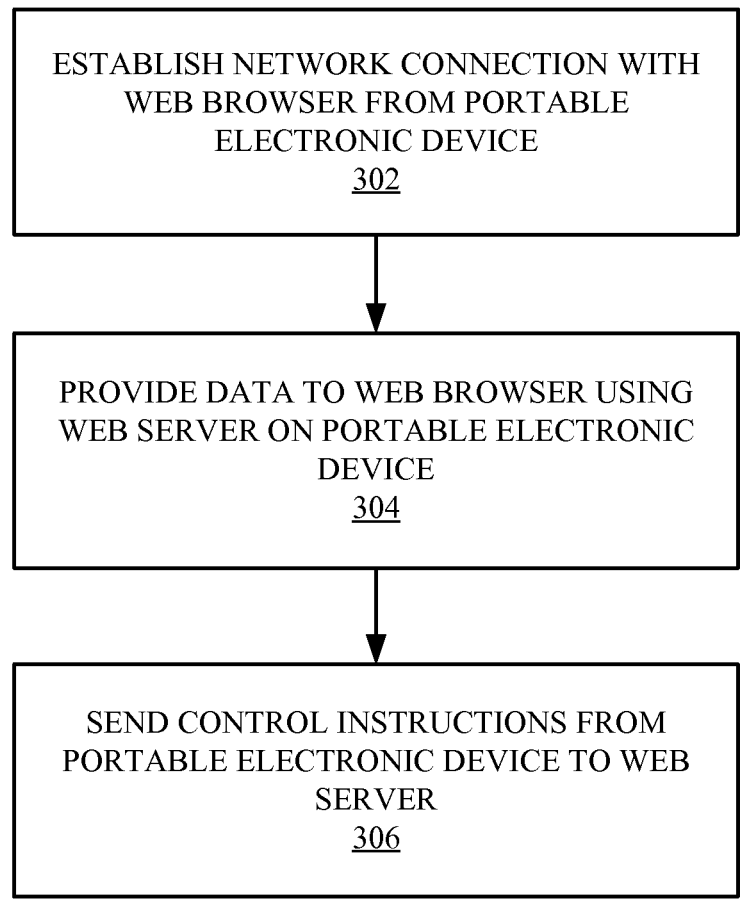
FIG. 3 shows a flowchart illustrating the process of interacting with a web browser in accordance with an embodiment.

FIG. 3 shows a flowchart illustrating the process of interacting with a web browser in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

First, a network connection with the web browser is established from a portable electronic device (operation 302). The portable electronic device may correspond to a mobile phone and/or other network-enabled device that stores digital media. The network connection may be established by broadcasting a service on the portable electronic device using a service discovery protocol and connecting to the web browser using the service discovery protocol. Next, data is provided to the web browser using a web server on the portable electronic device (operation 304). The data may include web applications, webpages, documents, images, and/or other types of digital media.

Finally, a set of control instructions is sent from the portable electronic device to the web browser (operation 306). The control instructions may direct the web browser to obtain and/or display the data. For example, the control instructions may direct the web browser to obtain and display a set of images stored on the portable electronic device. The control instructions may also specify the display of effects (e.g., transformations, laser pointers, etc.) associated with the images within the web browser.

For example, one embodiment of the system provides control instructions which facilitate using the portable electronic device to control a slideshow on one or more browsers. Note that these instructions are sent from the portable electronic device to the one or more web browsers and are acted on by applications which resides on the web browsers. Also, note that for each of these instructions, "DT" is the application namespace and "appController" is the application's global application controller. Moreover, the commands, such as "showPhoto," are methods associated with the respective object. Exemplary control instructions appear below.

DT.appController.showPhoto(photoID)—This instruction shows a photo, which is indexed by photoID, on a display for a browser-based presentation.

DT.appController.setSlideshowIndexInAlbum(photoIndex, albumID)—This instruction switches the browser to a slideshow for an album, which is indexed by albumID. This slide show starts at the photo which is indexed by photoIndex within that album and automatically sequences through the photos in the album.

DT.appController.stop( )—This instruction terminates a currently executing slide show.

DT.appController.showSpotlight(x,y)—This instructions shows a laser pointer on at a location x, y on the current photo. The arguments x and y are values in the unit square (i.e., they are in the range [0,1]), and the position of the laser pointer is determined by multiplying the values x and y by the width and height, respectively, of the associated image.

DT.appController.hideSpotlight( )—This instruction hides the laser pointer.

As mentioned previously, during operation of the system each browser makes repeated requests to a URL. For example, in one embodiment, the request is specified by "/poll/getAction?id=sessionID," where sessionID is a unique identifier for this client. A response is served back from the server on the portable electronic device to the browser with a MIME type of "application/x-javascript," telling a client JavaScript application (which is executing on the browser) to execute the contents of the response. The commands, therefore, are simply JavaScript code. Moreover, when the commands are generated, arguments are inserted into the commands based on the user action. For example, a command would be something like "DT.appController.showPhoto(131)", if the user of the portable electronic device had chosen to display photo 131.

Note that the application which resides on the web browser handles special effects for the slide show, such as producing special effects for transitions between photographs. For example, these special effects can include fading and dissolving between successive photographs and graphical animations of photographs moving.

Figure 4:
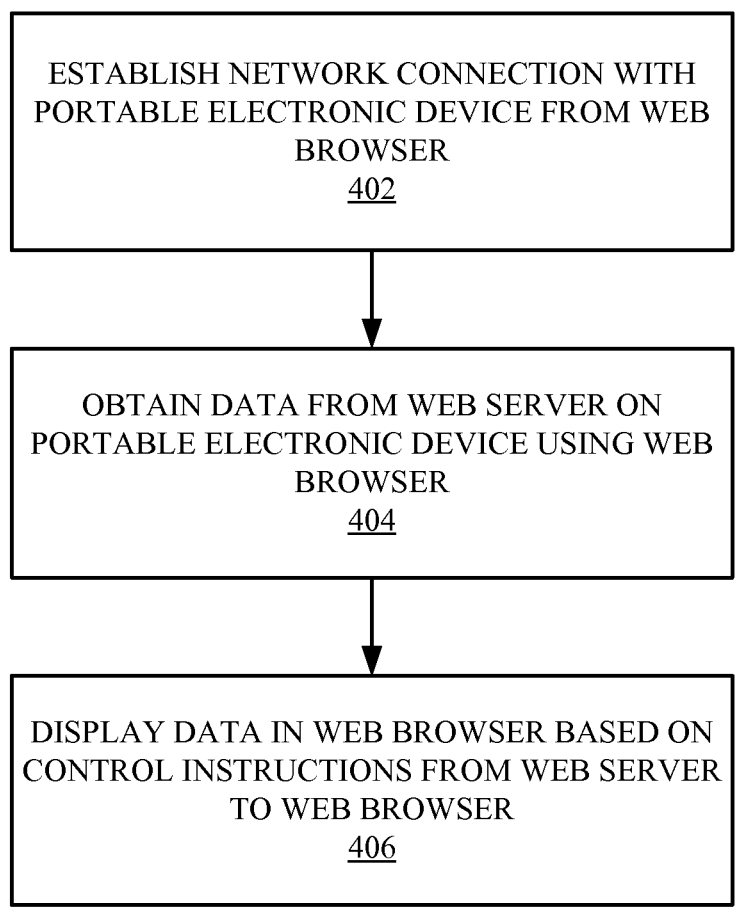
FIG. 4 shows a flowchart illustrating the process of interacting with a portable electronic device in accordance with an embodiment.

FIG. 4 shows a flowchart illustrating the process of interacting with a portable electronic device in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

Initially, a network connection is established with the portable electronic device from the web browser (operation 402). The web browser may execute on a computer system and/or different portable electronic device on the same LAN as the portable electronic device. Next, data from a web server on the portable electronic device is obtained using the web browser (operation 404). For example, the web browser may use HTTP to request and receive webpages, web applications, software libraries, and/or digital media from the web server. Finally, the data is displayed in the web browser based on a set of control instructions from the web server to the web browser (operation 406).

Figure 5:
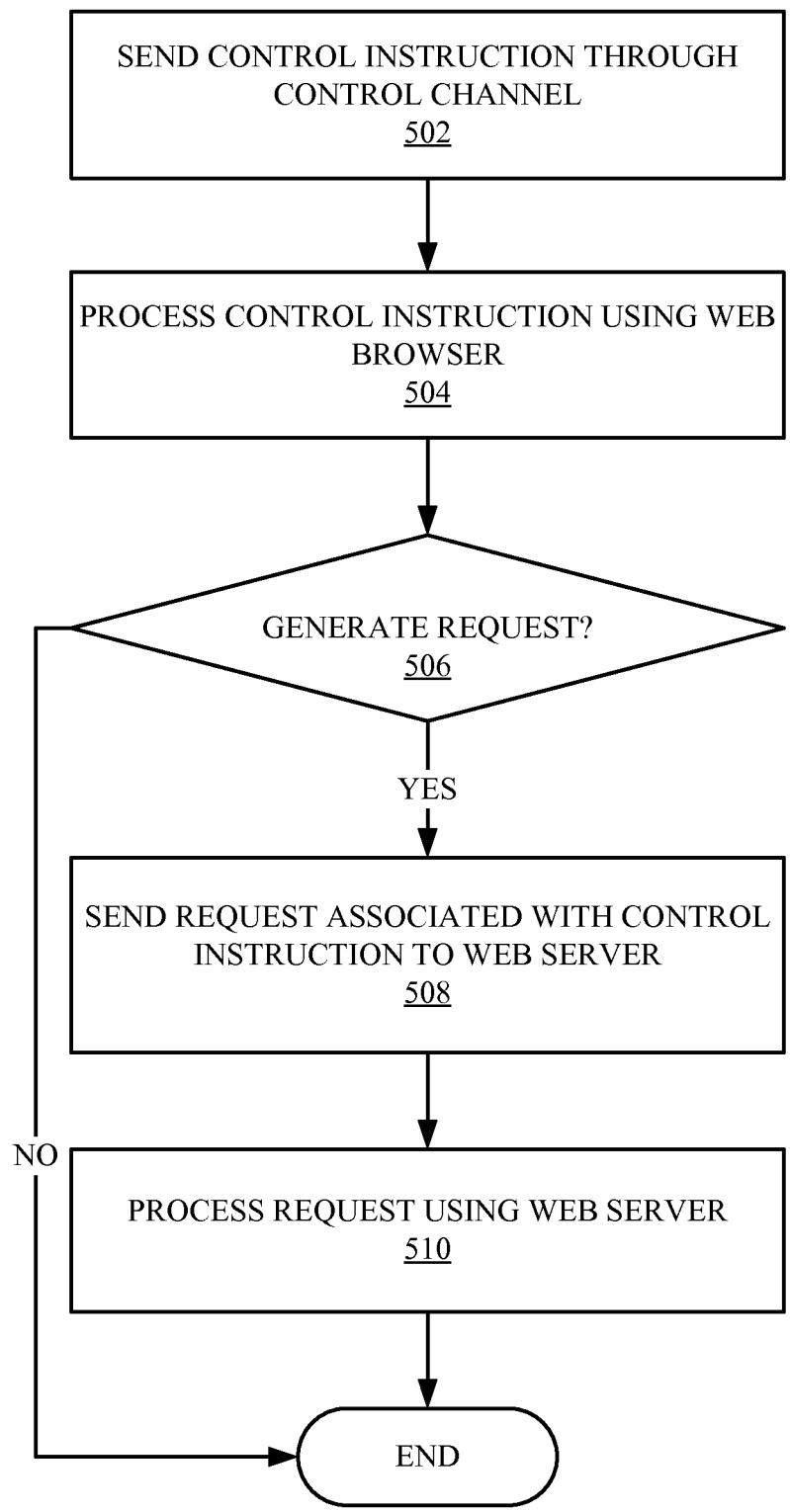
FIG. 5 shows a flowchart illustrating the process of using a control instruction to facilitate interaction between a web server and a web browser in accordance with an embodiment.

FIG. 5 shows a flowchart illustrating the process of using a control instruction to facilitate interaction between a web server and a web browser in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

Initially, the control instruction is sent through a control channel (operation 502) between the web server and web browser. The control channel may be established and maintained by repeatedly sending a request for a specific resource from the web browser to the web server. Consequently, the control instruction may be sent through the control channel as a response to the requested resource.

Next, the control instruction is processed using the web browser (operation 504). In particular, processing of the control instruction may involve the generation of a request (operation 506) associated with the control instruction, such as an HTTP request. For example, an HTTP request may be generated if the control instruction involves the transfer of data between the web server and web browser.

If no request is to be generated, the control instruction is carried out by the web browser without further interaction with the web server. For example, the web browser may process a control instruction for a laser pointer effect by calling a function on a web application to display a colored dot within a webpage. On the other hand, if a request associated with the control instruction is to be generated, the request is sent to the web server (operation 508), and the request is processed using the web server (operation 510). For example, the web server may process an HTTP request for data from the web browser by sending an HTTP response with the requested data.

Because requests from the web browser to the web server are generated as a result of control instructions from the web server to the web browser, the web server may essentially command the web browser to request data from the web server through the control channel. The web server may then respond with the data instead of sending the data directly to the web browser without sending a control instruction first. In other words, the control channel may allow the web browser to monitor the network connection for control instructions from the web server, while the control instructions may be used by the web server to direct behavior in the web browser using common network protocols such as HTTP as long as the network connection is maintained. Use of the control channel and/or control instructions to mediate interaction between the web browser and web server may thus prevent the web server from attempting to transmit data to the web browser if the web browser is no longer connected to the web server.

Figure 6:
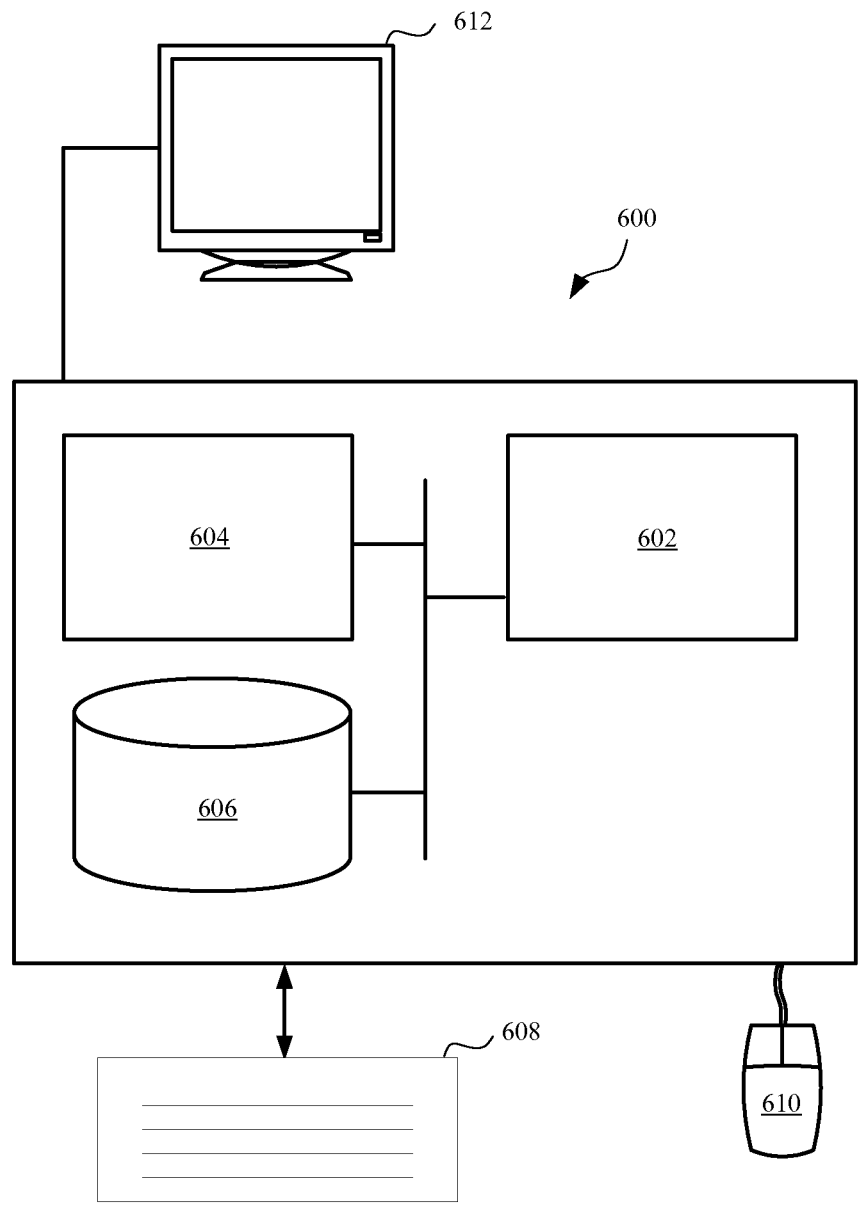
FIG. 6 shows a computer system in accordance with an embodiment.

FIG. 6 shows a computer system in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating interaction with a portable electronic device. The system may include a broadcasting apparatus that broadcasts a service associated with a web server on the portable electronic device using a service discovery protocol. The system may also include a web server that establishes a network connection with one or more web browsers using the service discovery protocol, provides data to the web browser(s), and directs the display of the data in the web browser(s).

In addition, one or more components of computer system 600 may be remotely located and connected to the other components over a network. Portions of the present embodiments (e.g., broadcasting apparatus, web browsers, web server, etc.) may also be located on different nodes of a distributed system that implements the embodiments. For example, the present embodiments may be implemented using a set of computer systems that communicate with the portable electronic device using a network connection with the portable device and display data obtained from the portable electronic device within web browsers.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for operating a transmitter device that facilitates sharing of media data between computing devices, the method comprising:
   by the transmitter device:
      connecting to an input channel of a first computing device;
      detecting a service that is broadcasted by a second computing device;
      in response to detecting the service, establishing a control channel with the second computing device;
      receiving, via the control channel, a command from an application executing on the second computing device, wherein the command corresponds to a request to display the media data at the first computing device;

receiving the media data from the second computing device; and causing the first computing device to display the media data through a first display device that is communicably coupled to the first computing device, wherein the second computing device displays, through a second display device that is communicably coupled to the second computing device, the media data simultaneously to the first computing device displaying the media data.

2. The method as in claim 1, wherein the first computing device and the second computing device are connected to a common local area network.

3. The method as in claim 1, wherein the command is sent from the application in response to a user selecting an image displayed at an interface of the application.

4. The method as in claim 1, wherein the command corresponds to a hypertext transfer protocol (HTTP) request.

5. The method as in claim 1, wherein the transmitter device is a remote device relative to the first computing device and the second computing device.

6. A transmitter device that enables media data to be shared between devices, the transmitter device comprising:

at least one processor; and at least one memory storing instructions that, when executed by the at least one processor, cause the transmitter device to carry out steps that include:

receiving, via a control channel associated with a second computing device, a request to receive the media data from an application executing on the second computing device;

receiving the media data from the second computing device; and causing a first computing device to display the media data through a first display device that is communicably coupled to the first computing device, wherein the second computing device displays, through a second display device that is communicably coupled to the second computing device, the media data simultaneously to the first computing device displaying the media data.

7. The transmitter device as in claim 6, wherein the media data includes a uniform resource locator (URL).

8. The transmitter device as in claim 6, wherein the request is sent from the application in response to a user selecting an image displayed at an interface of the application.

9. The transmitter device as in claim 6, wherein the request corresponds to a hypertext transfer protocol (HTTP) request.

10. The transmitter device as in claim 6, wherein the transmitter device is a remote device relative to the first computing device and the second computing device.

11. At least one machine-readable non-transitory storage medium configured to store instructions that, when executed by at least one processor included in an apparatus that is connected to a local area network, cause the apparatus to carry out steps that include:

detecting a service being broadcasted by a second computing device that is connected to the local area network;

establishing a control channel with the second computing device;

receiving, via the control channel, a request to receive media data from an application executing on the second computing device;

receiving the media data from the second computing device; and causing a first computing device to display the media data through a first display device that is communicably coupled to the first computing device, wherein the second computing device displays, through a second display device that is communicably coupled to the second computing device, the media data simultaneously to the first computing device displaying the media data.

12. The at least one machine-readable non-transitory storage medium as in claim 11, wherein the media data includes a uniform resource locator (URL).

13. The at least one machine-readable non-transitory storage medium as in claim 11, wherein the request is sent from the application in response to a user selecting an image displayed at an interface of the application.

14. The at least one machine-readable non-transitory storage medium as in claim 11, wherein the request corresponds to a hypertext transfer protocol (HTTP) request.

15. The at least one machine-readable non-transitory storage medium as in claim 11, wherein the apparatus is a remote device relative to the first computing device and the second computing device.

16. The at least one machine-readable non-transitory storage medium as in claim 11, wherein the media data is associated with an image or video displayed at the second computing device.

17. The at least one machine-readable non-transitory storage medium as in claim 16, wherein the second computing device is a portable electronic device, and the steps further include receiving a command to change an orientation of a picture displayed at the first computing device.

* * * * *